United States Patent [19]

Hodge et al.

[11] 3,985,210

[45] Oct. 12, 1976

[54] AUTOMATICALLY ENGAGED EMERGENCY PARKING BRAKE

[75] Inventors: Norman J. Hodge; John W. Bridwell, both of Peoria, Ill.

[73] Assignee: Caterpillar Tractor Co., Peoria, Ill.

[22] Filed: Feb. 18, 1975

[21] Appl. No.: 550,322

[52] U.S. Cl. .................................. 188/170; 303/16
[51] Int. Cl.² .......................................... B60T 13/68
[58] Field of Search............ 188/3 R, 3 H, 170, 171; 192/3 R, 3 G, 3 TR; 303/3, 15, 16

[56] References Cited
UNITED STATES PATENTS

| | | | |
|---|---|---|---|
| 2,688,719 | 9/1954 | Busquet | 188/171 UX |
| 3,528,707 | 9/1970 | Casey | 188/170 X |
| 3,759,357 | 9/1973 | Bianchetta | 192/3 R |
| 3,763,975 | 10/1973 | Fontaine | 192/3 TR |

*Primary Examiner*—Duane A. Reger
*Attorney, Agent, or Firm*—Phillips, Moore, Weissenberger, Lempio & Strabala

[57] ABSTRACT

A control system for a vehicle parking brake-actuator which releases the brake when subjected to fluid under pressure and which automatically sets the brake by spring force when the fluid pressure is relieved therefrom, the actuator being controlled by a valve which blocks or allows the relief of fluid pressure from the brake-actuator. The control system includes a solenoid for moving the valve to pressure-blocking position, a spring for moving the valve to pressure-relieving position when the solenoid is de-energized, and includes an electrical circuit for de-energizing the solenoid and causing an automatic setting of the brake if the vehicle engine is stopped or if there is a loss of oil pressure or electrical power. The brake can also be set by the operator when the engine is running.

8 Claims, 3 Drawing Figures

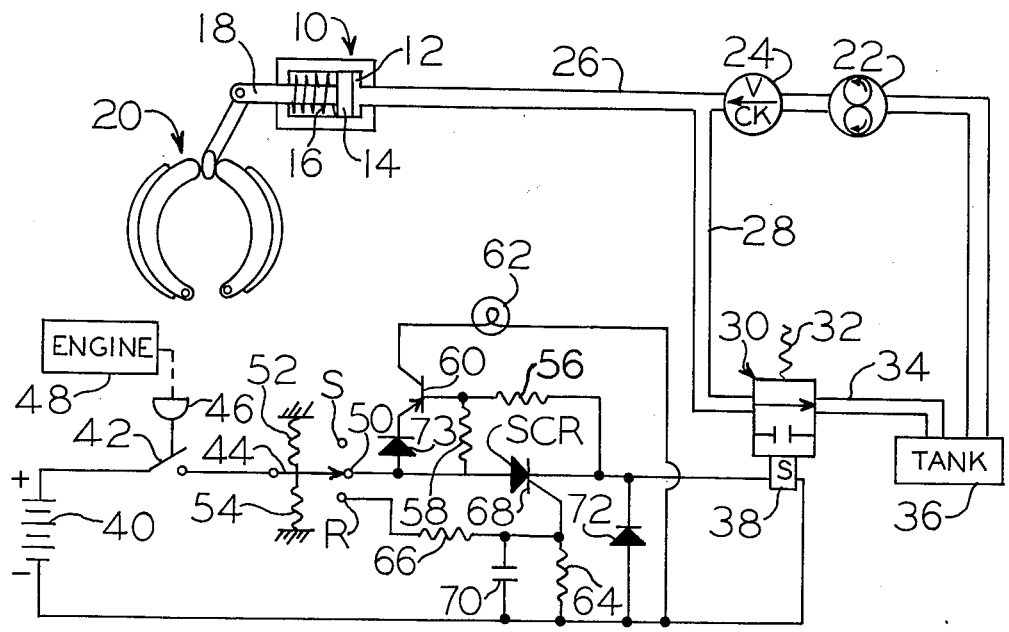
FIG_1_
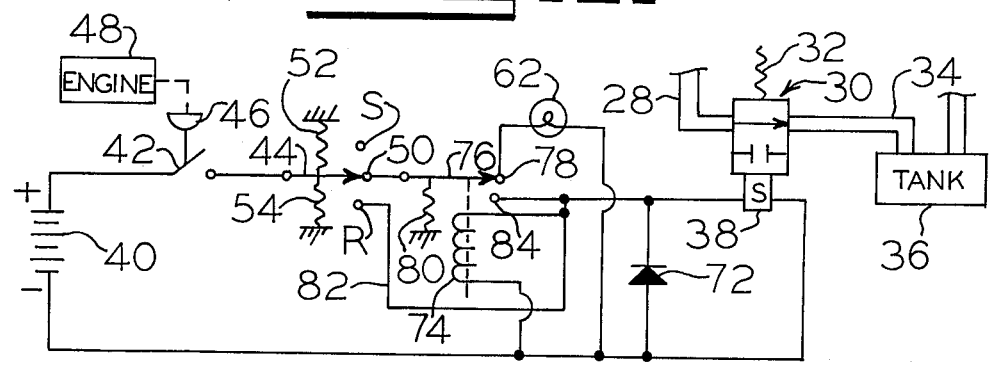
FIG_2_
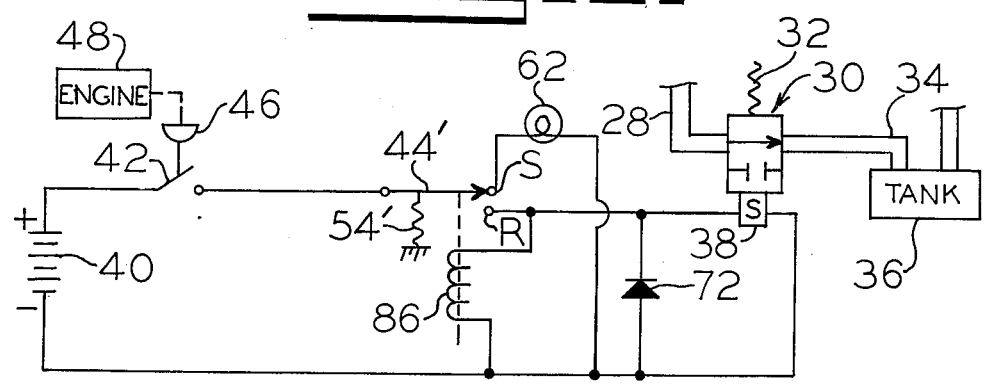
FIG_3_

AUTOMATICALLY ENGAGED EMERGENCY PARKING BRAKE

BACKGROUND OF THE INVENTION

This invention relates to a control system for a parking brake in an earth-moving vehicle. In particular, the invention relates to a control system which provides for automatic application of the vehicle parking brake in the event the vehicle engine is shut down or if there is an emergency situation as when there is a loss of oil pressure in the engine or a loss of electrical power, the control system at the same time enabling the operator to set the brake manually at any other time.

Many earth-moving vehicles employ safety or parking brake systems which include a brake-actuator that is normally spring-biased to a brake-setting position. Fluid under pressure from the hydraulic system of the vehicle is admitted to the brake-actuator to overcome the force of the brake-setting spring and thereby release the brake. Subsequent relief of such pressure from the actuator then enables the brake-setting spring to reapply the brake. An example of such a system is disclosed in U.S. patent application Ser. No. 435,113, entitled "Parking Brake Control System," filed on Jan. 21, 1974 by John W. Bridwell and Norman J. Hodge, of common assignment herewith.

Such parking brake systems should have a variety of capabilities. First, such systems should be able to supplement the primary braking system of the vehicle to ensure vehicle safety in the event of emergency conditions. For example, if the engine should die during operation of the vehicle, there will be a loss of hydraulic pressure required for operation of the primary brake system. In such event the parking brake system should cause an automatic application of the parking brake to bring the vehicle to a halt.

Secondly, the parking brake system should also be usable for normal parking situations wherein the parking brake is to be set to prevent vehicle movement when the vehicle is not in operation. In order to safeguard against operator forgetfulness, the parking brake should be set automatically when the engine is turned off.

Many times the vehicle may be at a standstill with the operator wishing to leave it for a short time without shutting down the engine. The parking brake system should have the capability of allowing the operator to apply the parking brake manually while the engine is operating.

SUMMARY OF THE INVENTION

The main object of the present invention is to provide an uncomplicated and reliable control system for a parking brake-actuator which will cause the parking brake to be set automatically either in case of emergencies or in the event the engine is turned off, while at the same time enabling the operator to set the parking brake manually while the engine is running.

In general, the control valve for the parking brake-actuator is normally spring-biased to a position wherein the parking brake is set, the control valve being movable against the bias of such spring by an electrically energized solenoid to a position whereby fluid pressure can be built up in the parking brake-actuator to release the parking brake. Subsequent setting of the brake is then responsive to deenergization of the solenoid. The control circuit for the solenoid includes a switch responsive to oil pressure which interrupts the energizing circuit to the solenoid in case of a loss of oil pressure through shut-down of the engine or an emergency which results in a loss of oil pressure. The control circuit also includes a manually operable switch which can be actuated to "brake release" position by the operator to release the parking brake, the circuit thereafter maintaining an energizing circuit to the solenoid after the operator releases the switch until such time as a condition arises wherein the parking brake is to be set automatically. The operator may also manually move the switch to "brake set" position to interrupt the energizing circuit to the solenoid and set the parking brake while the engine is still running.

It is a further object of the invention to provide a control system which provides a visual indication to the operator of whether the parking brake is set or not when the engine is running.

Other objects and advantages will become apparent in the course of the following detailed description.

BRIEF DESCRIPTION OF THE DRAWINGS

In the drawings forming a part of this application, and in which like parts are designated by like reference numerals throughout the same, FIG. 1 is a diagrammatic view of a parking brake system and electrical control therefor, constructed in accordance with the present invention and utilizing solid state components in the electrical control;

FIG. 2 is a diagrammatic view illustrating a modification of the electrical control for the parking brake system of FIG. 1 and utilizing a latching relay in the electrical control;

FIG. 3 is a diagrammatic view illustrating another modification of the electrical control for the parking brake system of FIG. 1, also utilizing a latching relay in the electrical control.

DESCRIPTION OF THE PREFERRED EMBODIMENT

Referring now to FIG. 1, the parking brake-actuator 10 includes a chamber 12 within which is disposed piston 14 which is engaged by and urged to the right by spring 16. The piston 14 has a rod 18 connected to the parking brake 20. Spring 16 mechanically urges piston 14 to the right, causing the parking brake to set whenever there is insufficient fluid pressure in chamber 12 to oppose the force of the spring.

Fluid under pressure from pump 22, which may also supply fluid to the transmission of the vehicle, is directed through check valve 24 and conduit 26 to chamber 12. If this pressure is allowed to build up in chamber 12, piston 14 will be forced to the left against the bias of spring 16 so that parking brake 20 will be released. Check valve 24 will prevent flow of pressure fluid from chamber 12 in the event of a decrease in fluid pressure upstream of the check valve and thus will trap pressure in chamber 12 and prevent setting of the parking brake in the event of a decrease in pressure that may occur from normal fluctuations in pump pressure. A branch conduit 28 communicates chamber 12 with a two-position control valve 30. Valve 30 is constantly biased by spring 32 to the pressure-relieving position shown in FIG. 1 wherein fluid may flow through conduit 28, valve 30 and conduit 34 back to the fluid supply tank 36. Solenoid 38, when energized, will move valve 30 against the bias of spring 32 to a position blocking fluid flow through conduit 28.

Thus, if solenoid 38 is energized and pump 22 is operating, the parking brake 20 will be released so that the vehicle may be moved. If solenoid 38 is then de-energized, spring 32 will move valve 30 to its illustrated position, relieving fluid pressure from chamber 12 and causing the parking brake to be set. Movement of control valve 30 between its two positions is caused solely by spring 32 and solenoid 38 and is thus not directly affected by the presence or absence of fluid pressure in the system. The branch conduit 28 and valve 30 have sufficient capacity so that when valve 30 is open, pressure in chamber 12 cannot build up enough to release the parking brake even though pump 22 may still be in operation.

The electrical control system for solenoid 38 includes a voltage source, such as battery 40 of the vehicle, and first and second switches 42 and 44 connected in series with each other and with the voltage source 40 and solenoid 38. Switch 38 is normally open and is actuated by operator 46 which is responsive to the oil pressure of engine 48. Whenever engine 48 is operating and there is oil pressure, switch 42 will be moved to closed position. If there is a loss in oil pressure, operator 46 will open switch 42.

Switch 44 has a "brake set" terminal S, a "brake release" terminal R and an intermediate terminal 50. Return springs 52 and 54 bias switch 44 away from the "brake set" and "brake release" positions so that the switch is normally in its intermediate position in contact with terminal 50.

A silicon-controlled rectifier SCR is connected in series with terminal 50 of switch 44 and the solenoid 38.

The control system of FIG. 1 operates as follows. Initially the engine 48 is off, valve 32 is open for flow therethrough, pressure has been relieved from brake-actuator 10, and spring 16 in actuator 10 has moved piston 14 to the right to set the parking brake 20.

The engine 48 is started, building up oil pressure which causes switch 42 to close. Switch 44 is in its normal intermediate position, but since SCR has not yet been energized, no current can pass therethrough to energize solenoid 38. As a consequence valve 30 remains in open position so that the fluid passing through pump 22 is passed back to tank 36, thus preventing the parking brake from being released.

A small amount of current, insufficient to energize solenoid 38, passes through resistors 56 and 58 to place a negative base voltage on transistor 60 allowing current flow therethrough to pilot light 62. Energization of the pilot light 62 provides a visual indication to the vehicle operator that the parking brake is still set.

To release the parking brake, the vehicle operator manually moves switch 44 against the bias of spring 54 to "brake release" position R in order to energize the SCR. Current flow through resistors 64 and 66 applies a voltage to gate 68 of SCR to condition SCR for conduction. Capacitor 70 connected across resistor 64 provides a time delay to prevent premature triggering of the SCR and to maintain the gate voltage on SCR during the time that switch 44 moves back to its intermediate position. Preferably, the switch 44 has "make before break" contacts so that when switch 44 moves from one position to another, engagement will be made with the contact to which the switch is moved before engagement is lost with the contact from which the switch is moved. Manual release of switch 44 allows springs 54 and 52 to center the switch in its intermediate position so that current can now pass through the gated SCR to energize solenoid 38. Valve 30 is now shifted against the bias of spring 32 to closed position, blocking flow of fluid therethrough. The fluid passing through pump 22 now builds up pressure in actuator 10 to release the parking brake. As long as SCR remains energized, i.e., in conduction, it will maintain the circuit therethrough to solenoid 38. The SCR will remain in conduction, even though the gating voltage is removed, until the circuit to solenoid is removed or a reverse bias is applied to the SCR.

As the SCR goes into conduction, the negative base voltage on transistor 60 is removed. Transistor 60 ceases conduction, turning off pilot light 62.

Diode 72 is provided in the circuit across solenoid 38 to prevent reverse current surges through the solenoid in a conventional manner. Diode 73 is provided in the pilot light circuit to protect transistor 60 against reverse current surges.

At any time, the operator can set the parking brake while the engine is running by moving switch 44 against the bias of spring 52 to its "brake set" position. This interrupts the circuit from the battery to solenoid 38, de-energizing the solenoid so that valve 30 returns to its illustrated position because of spring 32, thereby relieving pressure fluid from actuator 10 and setting the parking brake. Interruption of current flow through SCR turns it off.

Release of switch 44 by the vehicle operator allows spring 52 to return it to its intermediate position. The SCR cannot conduct, however, until it is again retriggered by movement of switch 44 to "brake release" position, and thus the parking brake remains set. Since the engine is still running, switch 42 is closed and pilot light 62 is illuminated to indicate that the brake is set. In order to release the parking brake, the operator must subsequently manually move switch 44 to its "brake release" position.

If, after the brake has been released, the engine is turned off, the oil pressure will drop and switch 42 will open, interrupting the circuit to solenoid 38 and de-energizing the SCR, causing the parking brake to be applied. Thus, the parking brake is automatically set each time the engine is turned off. Similarly, if at any time the oil pressure is lost while the engine is still running, the parking brake will be set.

Also, if there is an electrical power failure, solenoid 38 will be de-energized, again causing the parking brake to be applied.

Thus, the described control is fail safe in that failure of oil pressure or of the voltage source will cause an automatic application of the parking brake. At the same time, the vehicle operator can override the control at any time to set the parking brake.

The use of solid state components in the system of FIG. 1 enhances reliability of the system since it enables minimum use of elements which may fail under shock and vibration.

FIG. 2 illustrates a modification of the invention using a relay coil 74 and a two-position switch 76 operated thereby, the switch being normally biased to contact 78 by spring 80.

Insofar as the vehicle operator is concerned, the system of FIG. 2 operates in the very same manner as the system of FIG. 1. When the engine is started, switch 42 will close to complete a circuit through the intermediate position of switch 44 and through switch 76 to terminal 76 so that the pilot light 62 will be illuminated.

Movement of switch 44 to "brake release" position completes a circuit through contact R and line 82 to the relay coil 74 causing energization thereof and movement of switch 76 into engagement with contact 84. Manual release of switch 44 allows springs 54 and 52 to center the switch in its intermediate position. Since relay coil 74 is also connected to terminal 84, the relay coil will remain energized to hold switch 76 in position engaging contact 84. Relay 74 has a sufficiently long drop-out time so that switch 76 will remain in contact with terminal 84 during the time it takes for switch 44 to return to its intermediate position or else a "make before break" switch is used. A circuit is now complete through switches 42, 44 and 76 so that solenoid 38 is energized to cause release of the parking brake. As long as relay coil 74 remains energized it will maintain the circuit to solenoid 38.

As in FIG. 1, the operator may set the parking brake at any time the engine is running by moving switch 44 to "brake set" position, interrupting the circuit through switch 44 so that both solenoid 38 and relay coil 74 are deenergized. Release of switch 44 allows it to return to its intermediate position. Since switch 76 has returned to the illustrated position, relay coil 74 is not re-energized, and pilot light 62 goes on to indicate that the parking brake has been set.

Opening of switch 42 because of oil pressure failure or failure of the supply voltage will de-energize solenoid 38 and relay 74, causing an automatic application of the parking brake.

FIG. 3 illustrates yet another embodiment of the control circuit for energization and de-energization of solenoid 38. In this modification, the three-position switch 44 of FIGS. 1 and 2 is replaced by a two-position switch 44', having "brake set" S and "brake release" R positions, the switch being manually movable between these positions and being biased by spring 54' away from the "brake release" position to the "brake set" position. Relay coil 86 is connected to terminal R of switch 44' and will hold switch 44' in "brake release" position when energized.

In operation, when the engine is started, switch 42 will close, completing a circuit through switches 42 and 44' to terminal S, to which indicator light 62 is connected so that light 62 will illuminate to provide a visual indication that the brake is set. The operator may then manually move switch 44' to "brake release" position, completing the circuit to solenoid 38. The energization of this solenoid will then shift valve 30 to blocking position so that the parking brake is released. Since relay coil 86 is connected to terminal R, it will be energized and will latch switch 54' in "brake release" position, even though the switch is manually released, to maintain the circuit to solenoid 38 as long as relay coil 84 is energized.

If the vehicle operator wishes to set the parking brake while the engine is running, he manually moves switch 44' against the holding force of coil 84 to the "brake set" position. This interrupts the circuit to solenoid 38, allowing the brake to set, and causes indicator light 72 to be again lit. Spring 54' will maintain switch 44' in "brake set" position when the switch is released by the operator.

Lack of oil pressure will cause switches 42 to open, de-energizing solenoid 38 and holding coil 86. Similarly, a power failure will also de-energize solenoid 38 and holding coil 86. In either event, the parking brake will be set automatically and it cannot be released until after manual restoration of switch 44' to "brake release" position. De-energization of holding coil 86 allows spring 54' to move switch 44' automatically to "brake set" position.

As compared to the systems of FIGS. 1 and 2, the system of FIG. 3 has an advantage in that the brake is set whenever the switch 44' is in "brake set" position. Thus, the position of the switch provides a visual indication of the state of the parking brake and the indicator light 62 may be eliminated if desired. This is not the case in the systems of FIGS. 1 and 2 since the brake may be either set or released when the switch 44 is in its normal intermediate position. On the other hand, the system of FIG. 3 is somewhat disadvantageous as compared to the systems of FIGS. 1 and 2 since the switch 44' must be forced away from the hold of relay coil 84 in order to set the brake while the engine is running, whereas in the systems of FIGS. 1 and 2, there is no such holding force on switch 44 to restrain manual movement to "brake set" position.

What is claimed is:

1. In a system for a vehicle having an engine, a parking brake, an actuator for said brake for releasing said brake when said actuator is subjected to the force of fluid under pressure and for setting said brake when the force of said fluid is relieved from said actuator, and a two-position control valve having a first position allowing relief of fluid from said actuator and a second position blocking relief of fluid from said actuator, the improvement comprising:
   a. means biasing said control valve to its first position,
   b. electrically energizable solenoid means for moving said control valve to its second position against the bias of said means (a) when said solenoid means is energized,
   c. a voltage source,
   d. first and second switches connected in series with each other and with said voltage source and solenoid means, said first switch having open and closed positions, said second switch having "brake release" and "brake set" positions,
   e. means responsive to a vehicle condition for closing said first switch when the condition exists and for opening said first switch when the condition does not exist,
   f. means biasing said second switch away from its "brake release" position, said second switch being manually movable against said bias to its "brake release" position,
   g. means energizable from said voltage source upon manual movement of said second switch to its "brake release" position, said means being operable when energized to maintain a circuit to said solenoid means through said second switch following manual release of said second switch, said means being de-energized in response to manual movement of said second switch to "brake set" position.

2. In a system as set forth in claim 1, wherein said means (g) is energizable from said voltage source through said first switch when said first switch is in closed position.

3. In a system as set forth in claim 1 and further including:
   h. indicator means energizable from said voltage source through said second switch when said means (g) is deenergized.

4. In a system as set forth in claim 1, wherein said second switch has an intermediate position between its "brake release" and "brake set" positions, said second switch being biased away from both its "brake release" and "brake set" positions to said intermediate position, said second switch being manually movable from said intermediate position against such bias alternatively to its "brake release" and "brake set" positions and wherein the circuit maintained to said solenoid means by said means (g) extends through said intermediate position of said second switch.

5. In a system as set forth in claim 4, wherein said means (g) comprises a third switch having first and second positions and normally biased to said first position, said third switch being connected in series between the intermediate position of said second switch and said solenoid means for completing the circuit therebetween when said third switch is in its second position, and a relay coil connected to the "brake release" position of said second switch and also connected through the third switch when in its second position to the intermediate position of said second switch, said relay coil when energized being operable to move said third switch to its second position.

6. In a system as set forth in claim 4, wherein said means (g) comprises a silicon-controlled rectifier connected between the intermediate position of said second switch and said solenoid means and means responsive to movement of said second switch to "brake release" position for applying a gate voltage to said silicon-controlled rectifier.

7. In a system as set forth in claim 6, wherein said means (g) is energizable from said voltage source through said first switch when said first switch is in closed position.

8. In a system as set forth in claim 7, and further including:

h. indicator means energizable from said voltage source through the intermediate position of said second switch when said silicon-controlled rectifier is non-conducting.

\* \* \* \* \*